United States Patent
Allen et al.

(10) Patent No.: US 6,994,650 B2
(45) Date of Patent: Feb. 7, 2006

(54) PARK BRAKE MECHANISM FOR INTEGRATED TRANSMISSION AND TRANSFER CASE

(75) Inventors: Timothy Allen, Livonia, MI (US); Steven Thomas, Bloomfield, MI (US); Juliette McCoy, Macomb Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 169 days.

(21) Appl. No.: 10/706,126

(22) Filed: Nov. 12, 2003

(65) Prior Publication Data

US 2005/0101428 A1 May 12, 2005

(51) Int. Cl.
*F16H 37/06* (2006.01)

(52) U.S. Cl. .................... 475/295; 475/900
(58) Field of Classification Search ............. 475/295, 475/320, 332, 900

See application file for complete search history.

(56) References Cited

U.S. PATENT DOCUMENTS

| | | | |
|---|---|---|---|
| 4,369,671 A | 1/1983 | Matsumoto et al. | |
| 4,518,066 A | 5/1985 | Barr | |
| 4,726,262 A | 2/1988 | Hayakawa et al. | |
| 5,295,919 A | 3/1994 | Kobayashi | |
| 5,389,047 A | 2/1995 | Akiyama | |
| 5,743,348 A * | 4/1998 | Coppola et al. | 180/65.6 |
| 5,836,847 A | 11/1998 | Pritchard | |
| 5,890,986 A * | 4/1999 | Pritchard et al. | 475/206 |
| 6,161,643 A * | 12/2000 | Bober et al. | 180/249 |
| 6,292,732 B1 | 9/2001 | Steinmetz et al. | |
| 6,398,688 B2 * | 6/2002 | Brown et al. | 475/204 |
| 6,458,056 B1 | 10/2002 | Brown et al. | |
| 6,464,612 B2 | 10/2002 | Frost | |
| 6,575,866 B2 * | 6/2003 | Bowen | 475/5 |
| 6,602,159 B1 * | 8/2003 | Williams | 475/295 |
| 6,658,960 B2 * | 12/2003 | Babin et al. | 74/473.28 |
| 6,679,799 B2 | 1/2004 | Bowen | |
| 6,834,225 B1 * | 12/2004 | Jiang et al. | 701/67 |
| 2004/0220009 A1 | 11/2004 | Yu et al. | |

* cited by examiner

*Primary Examiner*—Sherry Estremsky
(74) *Attorney, Agent, or Firm*—David B. Kelley; MacMillan, Sobanski & Todd

(57) ABSTRACT

In a motor vehicle driveline having an automatic transmission driveably connected to a transfer case, a park gear, continually driveably connected through a planetary gear set to the drive wheels of the vehicle, is alternately fixed against rotation on the transfer case or released to rotate freely in response to movement of a gear selector having a park position. When the gear selector is moved to the park position, a pawl holds the drive wheels against rotation. When the gear selector is moved from the park position, the drive wheels are free to rotate without restraint of the park mechanism.

12 Claims, 5 Drawing Sheets

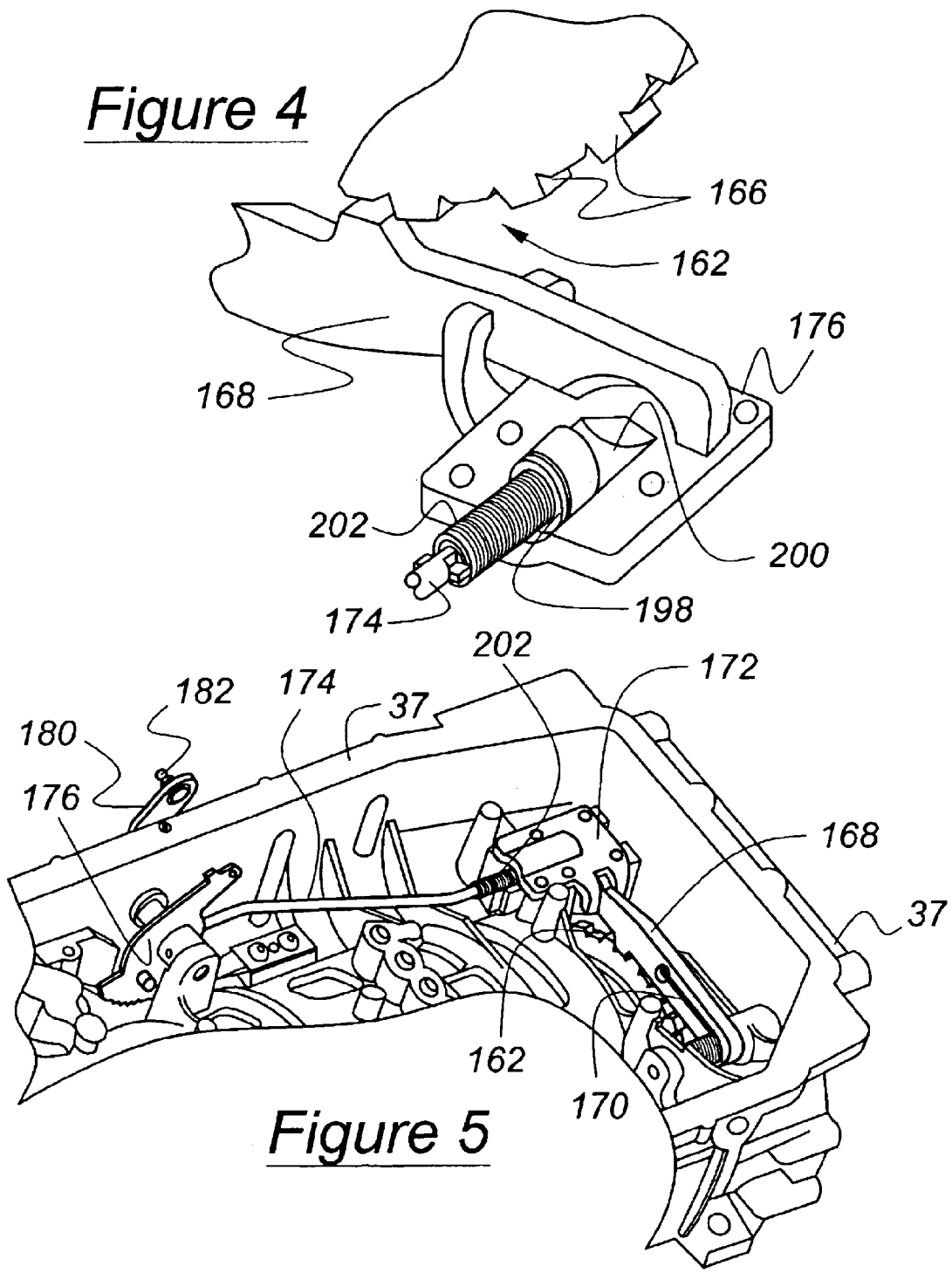

PARK BRAKE MECHANISM FOR INTEGRATED TRANSMISSION AND TRANSFER CASE

BACKGROUND OF INVENTION

1. Field of the Invention

This invention relates to a motor vehicle transfer case; more particularly it pertains to a park-brake mechanism for an integrated transfer case and transmission.

2. Description of the Prior Art

A transfer case usually includes a planetary gear set for producing either a "high" range, in which the transfer case output is driven at the same speed as the input, or a "low" range, in which the output is driven slower than its input speed. The 4×2 and 4×4 states of the transfer case are usually selected manually by the vehicle operator by operating a lever or switch. A first position of the lever causes a range selection device in the transfer case to direct power from the transmission output to a rear drive axle, the 4×2-drive mode. A second position of the lever causes the transfer case to direct power to both a front drive axle and a rear drive axle, the 4×4-drive mode.

In a driveline that includes a transfer case driven by a power transmission located in a torque delivery path between a power source, such as an engine or motor, and the drive wheels of the vehicle, a park-brake mechanism is provided to hold the transfer case output fixed against rotation. This mechanism prevents all the drive line components in the torque path from the location of the park mechanism to the drive wheels from rotating. The vehicle operator actuates this braking of the drive wheels by manually moving a gear selector to a park position.

However, failure of a component in the torque path between the park-brake mechanism and the drive wheels can result in loss of the park-braking function at the drive wheels. If such a failure occurs, the wheels can rotate and the vehicle can move even though the park mechanism and transmission are unaffected by the failure. Furthermore, although the vehicle operator can readily detect loss of the drive function because the wheels cannot be driven from the engine due to a failure in the torque path, the operator may not realize that the park function is also affected by a drive line component failure.

It is desirable to minimize the possibility of a drive line component failure that could affect the park-brake function.

High range and low range operation of the transfer case is produced conventionally by alternate engagement and disengagement of hydraulically actuated range clutches. The hydraulic clutches that control high and low range operation typically include a clutch pack of alternating spacer plates and friction discs, which are forced into friction contact when a piston located in a cylinder is pressurized with hydraulic fluid, thereby engaging the clutch. The clutch is disengaged by venting the cylinder, which permits a spring to release the piston allowing the plates and discs to separate.

In certain cases, at least one of the range clutches is normally-closed, requiring hydraulic pressure to disengage. This characteristic requires special precautions to assure that the normally-closed clutch will remain closed without hydraulic pressure during a park-brake condition. In other cases, where both range clutches are normally-open and because hydraulic pressure is usually unavailable during the park-brake condition, the park brake must bypass the range clutches and hold the transfer case output against rotation.

Additional security is provided if the range clutches are deleted entirely and replaced with a range selection device that provides a secure torque path compatible with the park-brake function, regardless of whether the high range or low range is selected. Preferably the range selection device is located in the transfer case, and the park brake holds the transfer case output against rotation on either the transmission case or transfer case. This arrangement brakes the drive wheels against rotation in the event of a failure of any component of the torque path between the engine and the transfer case output.

SUMMARY OF INVENTION

It is an advantage of this invention that the possibility of a drive line component failure that could affect the park-brake function is minimized. A hydraulically actuated mechanical range selector is used to control positively the components of an epicyclic gearset, which produces the high and low ranges in accordance with the connections produced by the range selector device. The output shaft is continually connected to the park mechanism through the range selector. The possibility of a component failure in the torque path between the park brake and the drive wheels is virtually eliminated.

It is another advantage of this invention that the park mechanism driveably connects the transfer case output to the transmission casing, thereby holding the drive wheels against rotation in either direction regardless of the selected range of the transfer case output. Furthermore, the installation of the park-brake mechanism is facilitated by its location near the interface of the transmission case and the transfer case.

It is yet another advantage that the package space required for park-brake function and range selection is reduced because need for large, expensive hydraulic clutches to produce the transfer case ranges is eliminated.

In realizing these and other advantages, a drive mechanism vehicle, according to this invention, for transmitting power to the wheels of a motor vehicle and for braking the vehicle includes a transfer case having a power input and an output adapted for a drive connection to at least one wheel. An epicyclic gearset, driveably connected to the input and the output, alternately produces a high range of output speed and a low range of output speed. A coupler includes a selector sleeve moveable alternately between a first position where the gearset produces the high range, and a second position where the gearset produces the low range. A park gear is driveably connected to the input, and a pawl, supported for releasable engagement with the park gear, prevents rotation of the park gear due to such engagement.

In another embodiment applicable to an integrated assembly, the invention includes a transfer case, which is fixed against rotation, has a first opening and includes input. A transmission, which is enclosed in a transmission case secured to the transfer case, has a second opening aligned with the first opening and includes a transmission output, which is connected to the input through the first and second openings. A planetary gearset includes a sun gear driveably connected to the input, a carrier driveably connected to the transfer case output, a ring gear, and a set of planet pinions rotatably supporting on the carrier in meshing engagement with the sun gear and ring gear. A coupler, which is driveably connected to the ring gear, includes a selector moveable alternately between a first position where the coupler completes a drive connection between the transfer case and ring gear, and a second position where the coupler mutually driveably connects the ring gear and one of the group consisting of the sun gear and carrier. A park gear is driveably connected to the input, and a pawl is supported for releasable engagement with the park gear to prevent rotation of the park gear due to such engagement.

BRIEF DESCRIPTION OF THE DRAWINGS

FIG. 4 is an isometric view of a portion of the park mechanism of FIG. 3.

FIG. 5 is an isometric view of the park-brake mechanism installed in a casing.

DETAILED DESCRIPTION OF THE PREFERRED EMBODIMENT(S)

Figure 1:
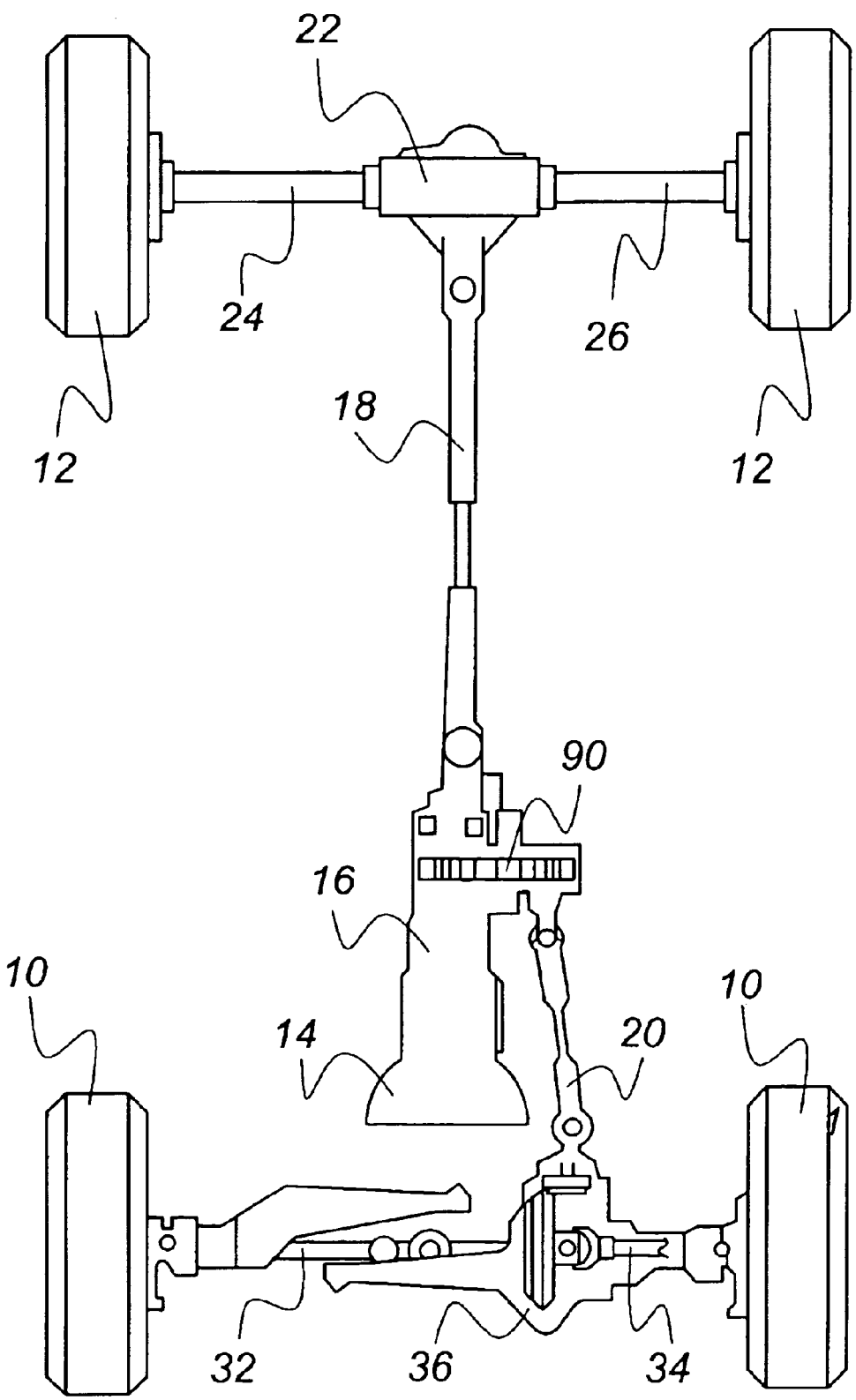
FIG. 1 is a top view of a motor vehicle driveline having a transmission, transfer case, and drive shafts extending to front wheels and rear wheels.

With reference now to the drawings and particularly to FIG. 1, the powertrain of a motor vehicle, to which the present invention can be applied, includes front and rear wheels 10, 12, a power transmission 14 for producing multiple forward and reverse speed ratios driven by an engine (not shown), and a transfer case 16 for continuously driveably connecting the transmission output to a rear drive shaft 18. The transfer case 16 selectively connects the transmission output to both the front drive shaft 20 and rear drive shaft 18 when a four-wheel drive mode of operation is selected, either manually or electronically. Shaft 18 transmits power to a rear wheel differential mechanism 22, from which power is transmitted differentially to the rear wheels 12 through axle shafts 24, 26, which are contained within a differential housing. The front wheels are driveably connected to right-hand and left-hand axle shafts 32, 34, to which power is transmitted from the front drive shaft 20 through a front differential mechanism 36.

Figure 2A:
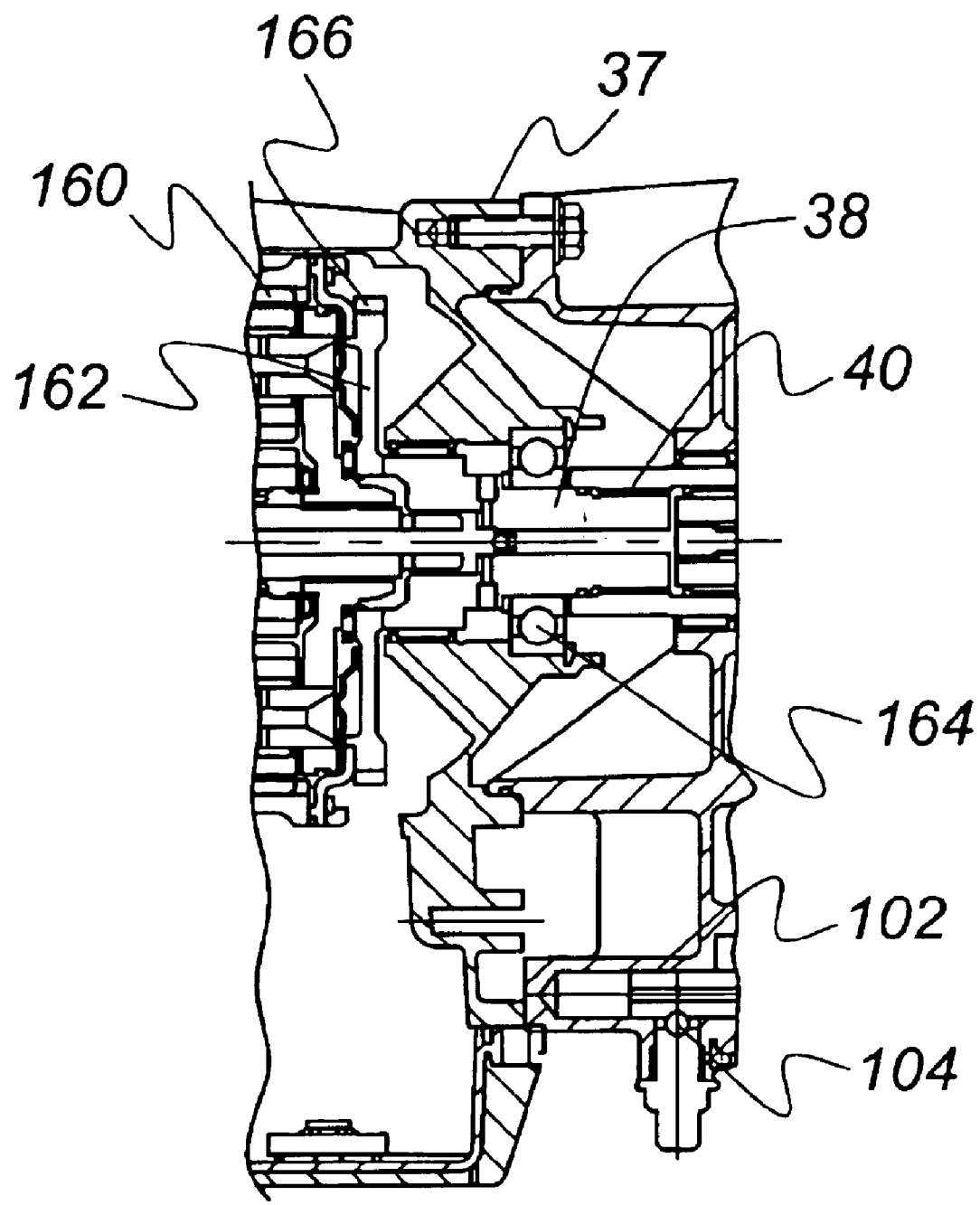
FIG. 2 is a cross sectional view showing an integrated transfer case and automatic transmission.
Figure 2B:
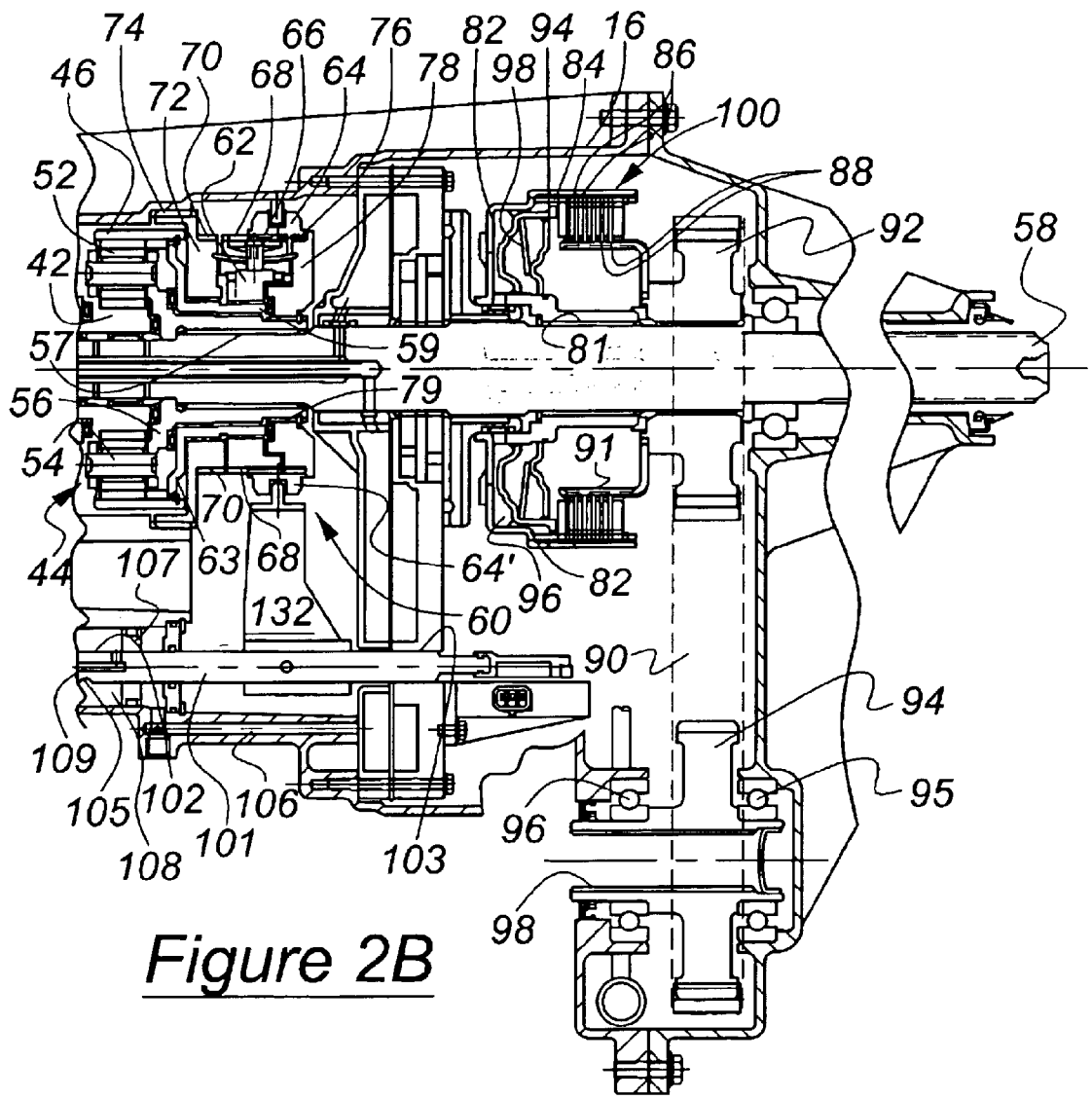

Referring now to FIG. 2, the output shaft 38 of the automatic transmission 14 extends through the transmission casing 37 into the casing 16 of the transfer case. Shaft 38 is driveably connected through a spline 40 to the sun gear 42 of a simple planetary gear set, an epicyclic train 44. Sun gear 42 is in continuous meshing engagement with a set of planet pinions 52, which are supported for a rotation on stub shafts 54, each stub shaft supported at opposite axial ends on a carrier 56. Each of the planet pinions 52 is in continuous meshing engagement with the sun gear 42 and a ring gear 46. Carrier 56 is driveably connected through spline 57 to the output 58 of the transfer case, which is adapted for connection to the rear driveshaft 18.

A high-low coupler 60 includes a hub 62, which is driveably connected through a spline 59 and radial disc 63 to ring gear 46. Coupler 60 includes a sleeve 64, formed on its inside surface with a system of axially directed spline teeth 66, engaged continuously with a system of spline teeth 68 formed on the outer surface of the hub 62. The sleeve 64 slides axially leftward and rightward on the hub. In FIG. 2, the coupler 60 shown above the axis of output shaft 58 is a synchronizer; the coupler shown below that axis is a dog clutch.

The teeth 66 of the sleeve 64 are engageable alternately with axially directed spline teeth 70 formed on a radially outer surface of a disc 72, which is continually fixed against a rotation by its engagement at 74 with teeth formed on the inner surface of the transfer case 16. The teeth 66 of sleeve 64 are engageable also with a system of axially directed spline teeth 76 formed on a radially outer surface of a disc 78.

Disc 78 is splined at 79 to carrier 56, which is splined at 57 to output shaft 58. Spline 81 driveably connects shaft 58 to a drum 82, which is formed on its inner surface with axially directed spline teeth 84. Spacer plates 86 are driveably engaged with the spline 84 of drum 82. Friction discs 88, interposed between adjacent spacer plates 86, are driveably engaged by spline teeth formed on the outer surface of an arm 91, which extends axially from a drive belt sprocket wheel 92.

Located within drum 82 is a hydraulically actuated piston 94, which moves axially in response to the pressurized and vented state of a hydraulic cylinder 96 located between drum 82 and piston 94. When cylinder 96 is pressurized, piston 94 moves rightward forcing the spacer plates 86 and friction discs 88 into mutual frictional engagement, thereby driveably connecting output 58 and sprocket wheel 92. When cylinder 96 is vented, piston 94 is moved leftward to the position shown in FIG. 2 due to a force applied to the piston by a Belleville spring 98, thereby driveably disconnecting output 58 and sprocket wheel 92. In this way, clutch 100 alternately driveably connects and disconnects output 58 and sprocket wheel 92.

When clutch 100 is engaged, power is transmitted to the forward drive shaft 20 from the output shaft 58 by a drive belt 90, which is continually engaged with sprocket wheel 92. Bearings 95, 96 rotatably support sprocket wheel 94 on the transfer case 16, and forward drive shaft 20 is driveably connected through a spline 98 formed on the inner surface of the sprocket wheel 94. In this way, when clutch 100 is engaged, output shaft 80 transmits power both to the rear drive shaft 18, which is connected by a universal joint to output shaft 80, and to the forward drive shaft 20.

In operation, drive shaft 20 is driven alternately at the same speed as that of the transmission output shaft 38, or shaft 20 is underdriven in relation to the speed of shaft 38, in accordance with the position of the coupler sleeve 64.

Carrier 56 is continually driveably connected to output shaft 58 through spline 57. Ring gear 46 is driveably connected to output shaft 58 through the torque delivery path that includes disc 63, coupler hub 62, coupler sleeve 64, disc 78 and splines 79, 57. Therefore, when sleeve 64 moves rightward to the position shown in FIG. 2, ring gear 46 and carrier 56 are mutually driveably connected, and ring gear 46, carrier 56 and output 58 are driven at the same speed as that of sun gear 42 and the input 38. This is the high-speed range.

When sleeve 64 of coupler 60 is moved leftward to produce a drive connection between disc 72 and coupler hub 62, ring gear 46 is fixed against rotation on the transfer case 16 through the torque path that includes disc 63, coupler hub 62, its sleeve 64 and disc 72. This provides a torque reaction and causes carrier 56 and output 58 to be underdriven in relation to the speed of sun gear 42 and shaft 38. This creates a low-range drive connection between transmission output 38 and the transfer case output 58.

Clutch 100 can be engaged regardless of the position of coupler sleeve 64 so that power is transmitted by the drive belt mechanism, which includes sprocket wheels 92, 94 and drive belt 90. In this way, both the forward drive shaft 20 and rear drive shaft 18 are driven alternately in the low-range and high-range, or only the rear drive shaft is driven in the low-range and high-range.

The transmission output 38 is driven by a ring gear 160, which is secured through a park gear 162 to output shaft 38. The park gear and shaft 38 are supported on the transmission case 37 by a bearing 164. The outer surface of the park gear is formed with teeth 166 separated by spaces 167, adapted for engagement by a park mechanism. Each tooth has a crown and a radial face.

Figure 3:
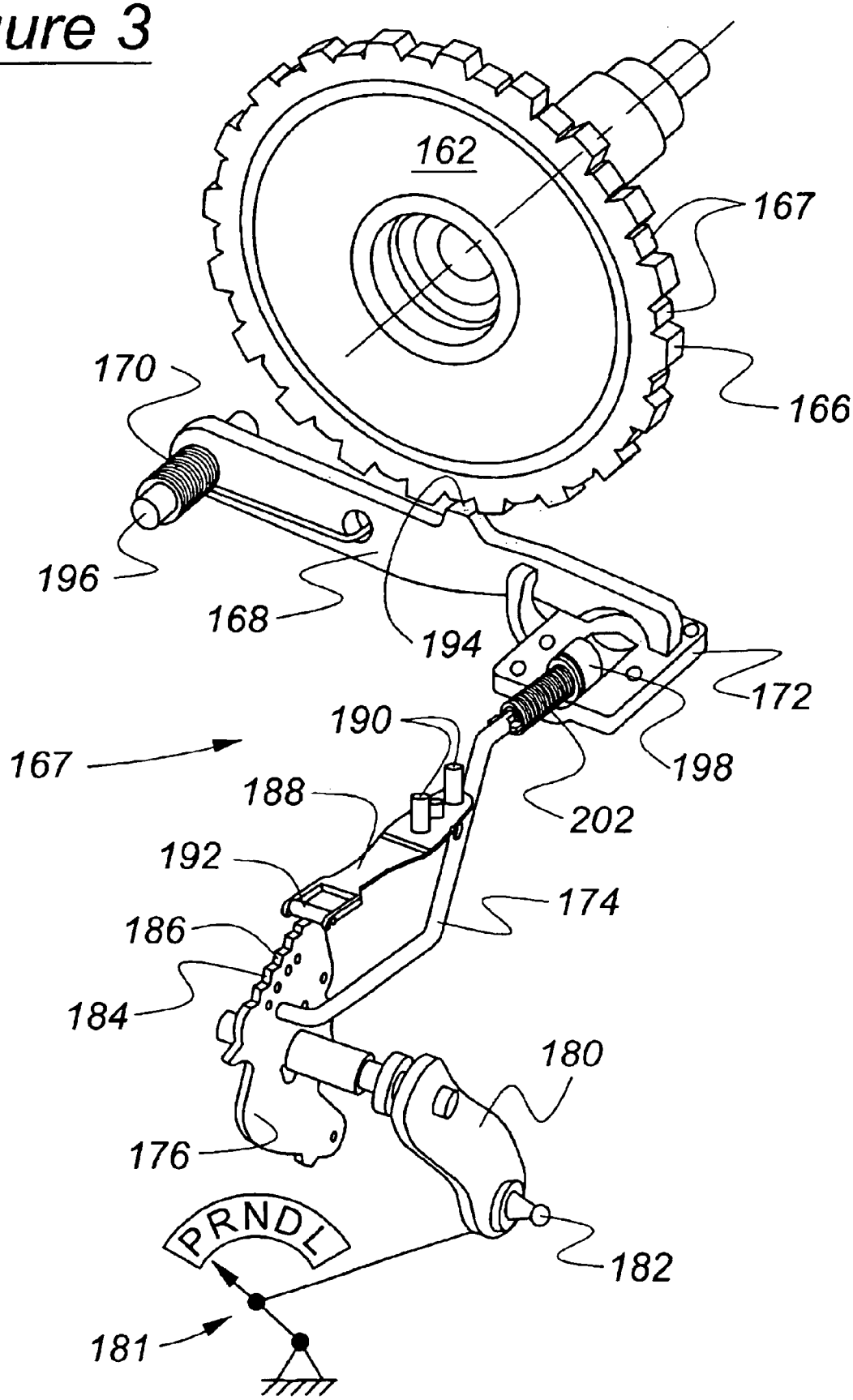
FIG. 3 is an isometric view of a park mechanism.

Turning now to FIGS. 3, 4 and 5, a park mechanism 167 for holding the park gear 162, transmission output shaft 37, and transfer case output 58 against rotation includes a park pawl 168, a return spring 170, abutment 172, park rod 174, detent lever 176, and external lever 180. Lever 180, located outside the case and supported on the case wall, is connected at a pinned connection 182 to a rod, which rotates lever 180 in response to movement of a gear selector lever 181 located in the passenger compartment. The vehicle operator moves the gear selector manually among positions corresponding to the operating ranges of the transmission. These ranges, usually identified on the selector by "PRNDL", correspond to park, reverse, neutral, drive and low.

Lever 180 transmits its pivoting motion to detent lever 176, which is located inside transmission case 37. Lever 176 is formed at its radially outer periphery with a series of spaced teeth 184 and recesses 186, each recess corresponding to a position of the selector lever. A detent spring 188, secured by rivets or pins 190 to the case 37, carries a roller follower 192, which maintains resilient contact with the toothed profile of lever 176.

The return spring 170 continually biases a tooth or projection 194 on the surface of the pawl 168 out of engagement with the park gear 162 and biases the pawl into contact with abutment 176, which is fixed to case 37. The pawl 168 is fixed to the case 37 by a bolt 196 and is supported there for pivotal movement about the axis of the bolt.

Park rod 174 transmits movement of the lever 176 to a cam 198, which slides axially into and out of contact with pawl 168 as rod 174 moves. The cam has an inclined surface 200, which slides under the pawl and forces the pawl projection 194, against the force of spring 170, into a space 167 between the teeth 166 and into engagement with a radial face of a tooth 166 of the park gear 162 when lever 176 moves to the park position and rod 174 moves toward park gear 162.

Whenever the park pawl contacts the crown of a tooth 166 while attempting to seat in a space 167 on gear 162, a ratchet spring 202 compresses and allows cam 198 to move backward, as rod 174 is pushed forward. When the pawl projection 194 becomes located in a space 167 between teeth on park gear 162, cam 198 springs forward into contact with the pawl 168 forcing the pawl projection 194 to engage gear 162. This engagement holds the park gear 162 and shaft 38 against rotation on case 37. When the range selector lever 181 moves to any position other than park, rod 174 pulls the cam out of engagement with pawl 186, and the return spring 170 pivots the pawl out of engagement with park gear 162.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

We claim:

1. A park brake mechanism for braking a drive line that transmits power to the wheels of a motor vehicle, comprising:

an epicyclic gearset driveably connected to the input and the output, adapted to produce alternately a high range of output speed and a low range of output speed;

a coupler including a selector moveable alternately between a first position where the gearset produces the high range, and a second position where the gearset produces the low range;

a park gear driveably connected to the input;

a pawl supported for releasable engagement with the park gear and preventing rotation of the park gear due to such engagement;

a gear selector moveable among positions representing operating ranges of a transmission, the positions including a park position; and a connector attached to the gear selector and the pawl, adapted to transmit movement of the gear selector to the pawl, the pawl engaging the park gear and preventing rotation of the park gear in response to movement of the gear selector to the park position.

2. The mechanism of claim 1, wherein:

the connector further includes a detent lever connected to the gear selector supported for displacement in response to movement of the gear selector; and the mechanism further comprises; and a park rod connected to the detent lever for movement therewith, including a cam for forcing the pawl into engagement with the park gear when the gear selector is in the park position and allowing disengagement of the pawl from the park gear.

3. The drive mechanism of claim 1, wherein:

the park gear further comprises teeth distributed around a periphery of the park gear, each tooth having a crown and a radial face, and having a space between each tooth; and the pawl further comprises a projection adapted to engage the radial face of a tooth on the park gear.

4. The drive mechanism of claim 3, further comprising:

an abutment having a surface for guiding the cam toward the pawl; and a ratchet spring carried on the park rod, biasing the cam toward the pawl, and permitting retraction of the cam from the pawl in opposition to movement of the park rod toward the pawl due to contact of the projection and the crown of a tooth on the park gear.

5. A park mechanism for braking the wheels of a motor vehicle, comprising:

a casing fixed against rotation, including a power input and an output;

an epicyclic gearset driveably connected to the input and the output, adapted to produce alternately a high range of output speed and a low range of output speed;

a coupler continually driveably connected to a first component of the gearset, and adapted for alternate drive connections to a second component of the gearset and to the casing, including a selector moveable alternately between a first position where the gearset produces the high range, and a second position where the gearset produces the low range;

a park gear driveably connected to the input;

a pawl supported for releasable engagement with the park gear and preventing rotation of the park gear due to such engagement;

a gear selector moveable among positions representing operating ranges of a transmission, the positions including a park position; and a connector attached to the gear selector and the pawl, adapted to transmit movement of the gear selector to the pawl, the pawl engaging the park gear and preventing rotation of the park gear in response to movement of the gear selector to the park position.

6. The park mechanism of claim 5, wherein:

the connector further comprises a detent lever connected to the gear selector, supported on the casing for rotary movement in response to movement of the gear selector; and a park rod connected to the detent lever for movement therewith, including a cam for forcing the pawl into engagement with the park gear when the gear selector is in the park position and allowing disengagement of the pawl from the park gear whereby the output is free to rotate.

7. The park mechanism of claim 6, wherein:

the park gear further comprises teeth distributed around a periphery of the park gear, each tooth having a crown and a radial face, and having a space between each tooth; and the pawl further comprises a projection adapted to enter a space and to engage a radial face of a tooth on the park gear.

8. The park mechanism of claim 7, further comprising:

an abutment fixed to the transmission case, having a surface for guiding the cam toward the pawl; and a ratchet spring carried on the park rod, biasing the cam toward the pawl, and permitting retraction of the cam from the pawl in opposition to movement of the park rod toward the pawl due to contact of the projection and the crown of a tooth on the park gear;

a park gear driveably connected to the input;

a gear selector moveable among positions including a park position; and a pawl supported for releasable engagement with the park gear and preventing rotation of the park gear due to such engagement.

9. An integrated transfer case and transmission assembly for transmitting power to the wheels of a motor vehicle and for braking the vehicle, comprising:

a first case fixed against rotation, having a first opening, including an input and an output;

a second case secured to the first case, having a second opening aligned with the first opening, including an output driveably connected to the input through the first and second openings;

a sun gear driveably connected to the input;

a carrier driveably connected to the output of the first case;

a ring gear;

a set of planet pinions rotatably supporting on the carrier in meshing engagement with the sun gear and ring gear;

a coupler driveably connected to the ring gear, including a selector moveable alternately between a first position where the coupler completes a drive connection between the first case and ring gear, and a second position where the coupler mutually driveably connects the ring gear and one of the group consisting of the sun gear and carrier;

a park gear driveably connected to the input; and a pawl supported for releasable engagement with the park gear and preventing rotation of the park gear due to such engagement;

a gear selector moveable among positions representing operating ranges of a transmission, the positions including a park position; and a connector attached to the gear selector and the pawl, adapted to transmit movement of the gear selector to the pawl, the pawl engaging the park gear and preventing rotation of the park gear in response to movement of the gear selector to the park position.

10. The assembly of claim 9, wherein the connector further comprises;

a detent lever connected to the gear selector, supported on the second case for rotary movement in response to movement of the gear selector; and a park rod connected to the detent lever for movement therewith, including a cam for forcing the pawl into engagement with the park gear when the gear selector is in the park position and allowing disengagement of the pawl from the park gear whereby the output is free to rotate.

11. The assembly of claim 10, wherein:

the park gear further comprises teeth distributed around a periphery of the park gear, each tooth having a crown and a radial face, and having a space between each tooth; and the pawl further comprises a projection adapted to enter a space and to engage the radial face of a tooth on the park gear.

12. The assembly of claim 11, further comprising:

an abutment fixed to the second case, having a surface for guiding the cam toward the pawl; and a ratchet spring carried on the park rod, biasing the cam toward the pawl, and permitting retraction of the cam from the pawl in opposition to movement of the park rod toward the pawl due to contact of the projection and the crown of a tooth on the park gear.

* * * * *